July 16, 1929. H. G. HOOPER 1,721,450
HEAVIER-THAN-AIR FLYING MACHINE
Original Filed Oct. 4, 1926 6 Sheets-Sheet 1
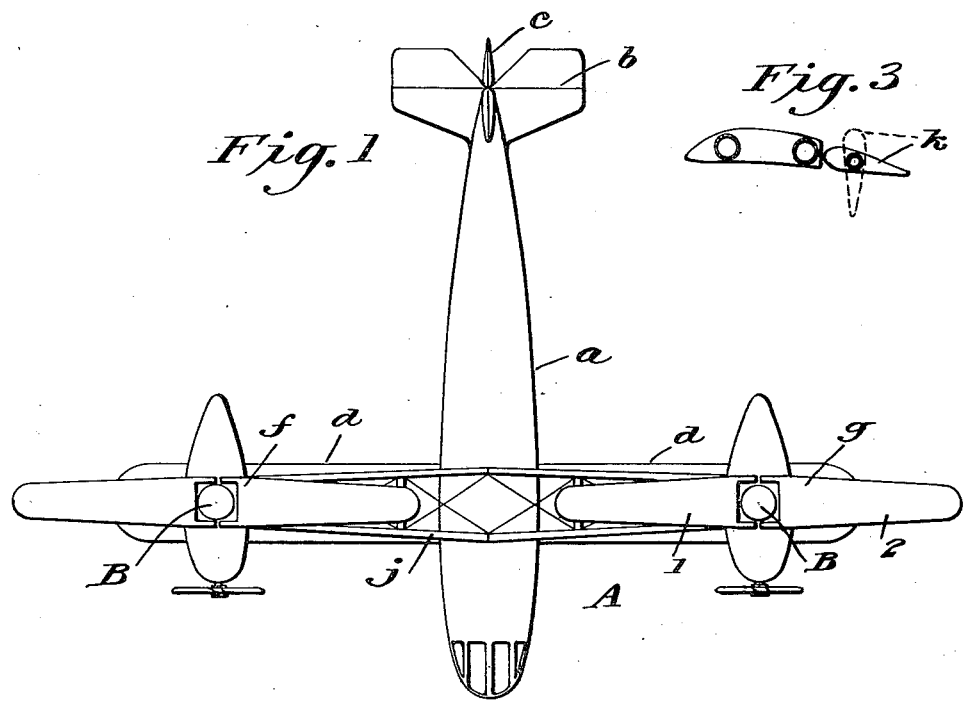
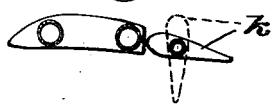
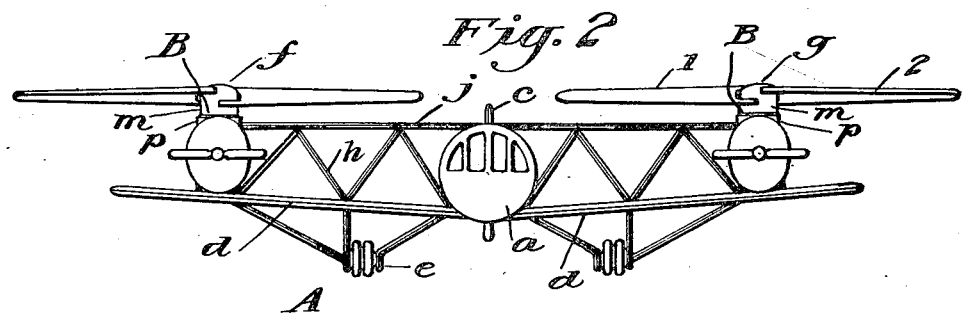
INVENTOR,
Harris G. Hooper;
BY
Blakeslee & Brown
ATTORNEYS.

July 16, 1929.  H. G. HOOPER  1,721,450
HEAVIER-THAN-AIR FLYING MACHINE
Original Filed Oct. 4, 1926    6 Sheets-Sheet 2
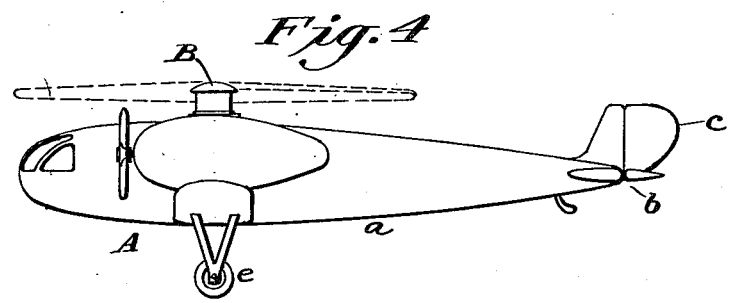
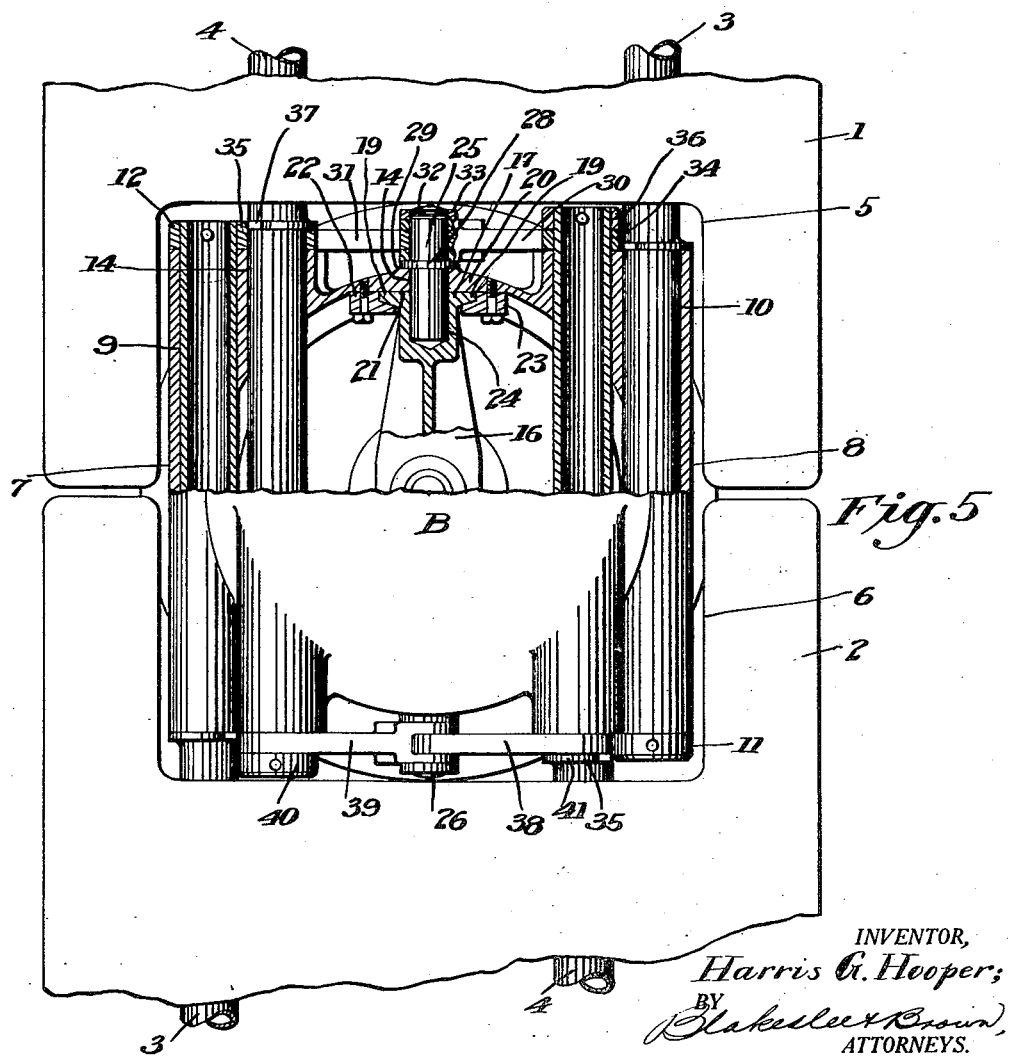
INVENTOR,
Harris G. Hooper;
BY
Blakeslee & Brown
ATTORNEYS.

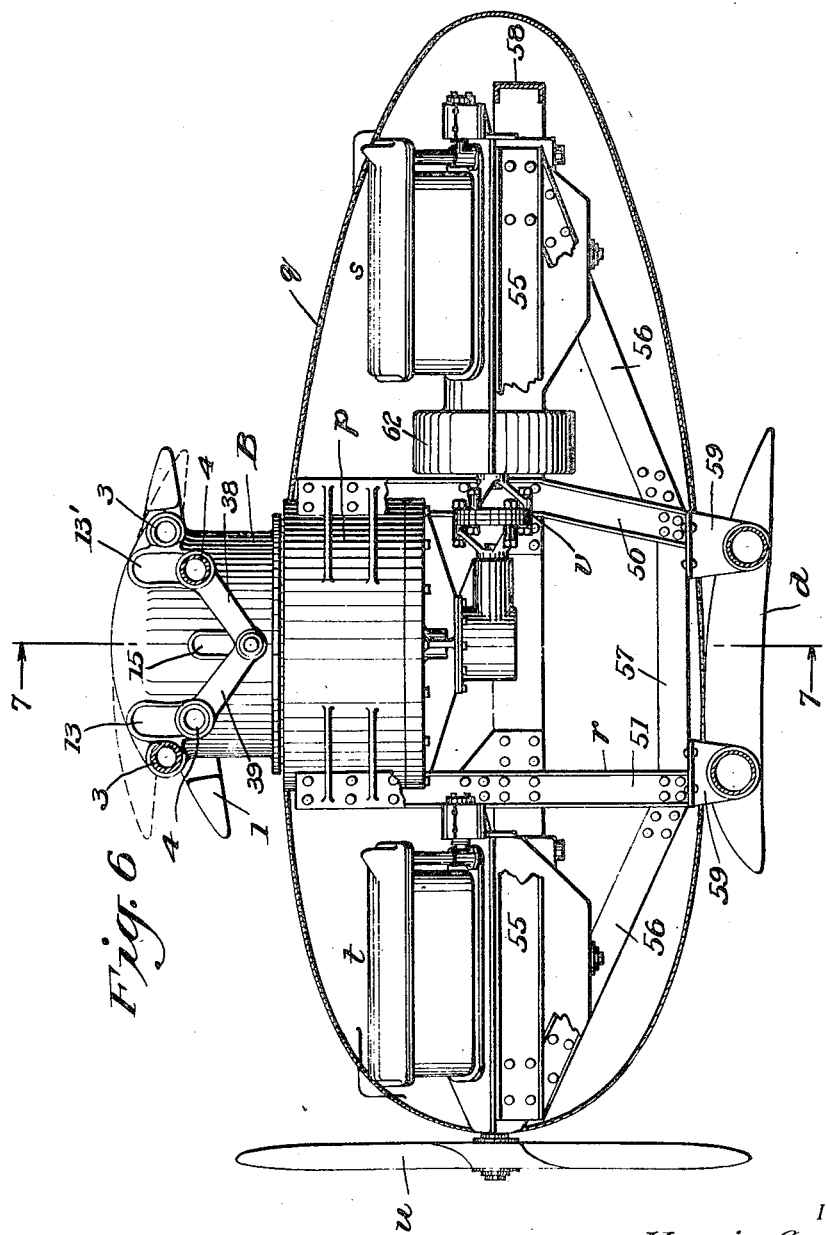

July 16, 1929.                H. G. HOOPER                1,721,450
                      HEAVIER-THAN-AIR FLYING MACHINE
                Original Filed Oct. 4, 1926    6 Sheets-Sheet 4

INVENTOR,
Harris G. Hooper;
BY
Blakeslee Brown,
ATTORNEYS.

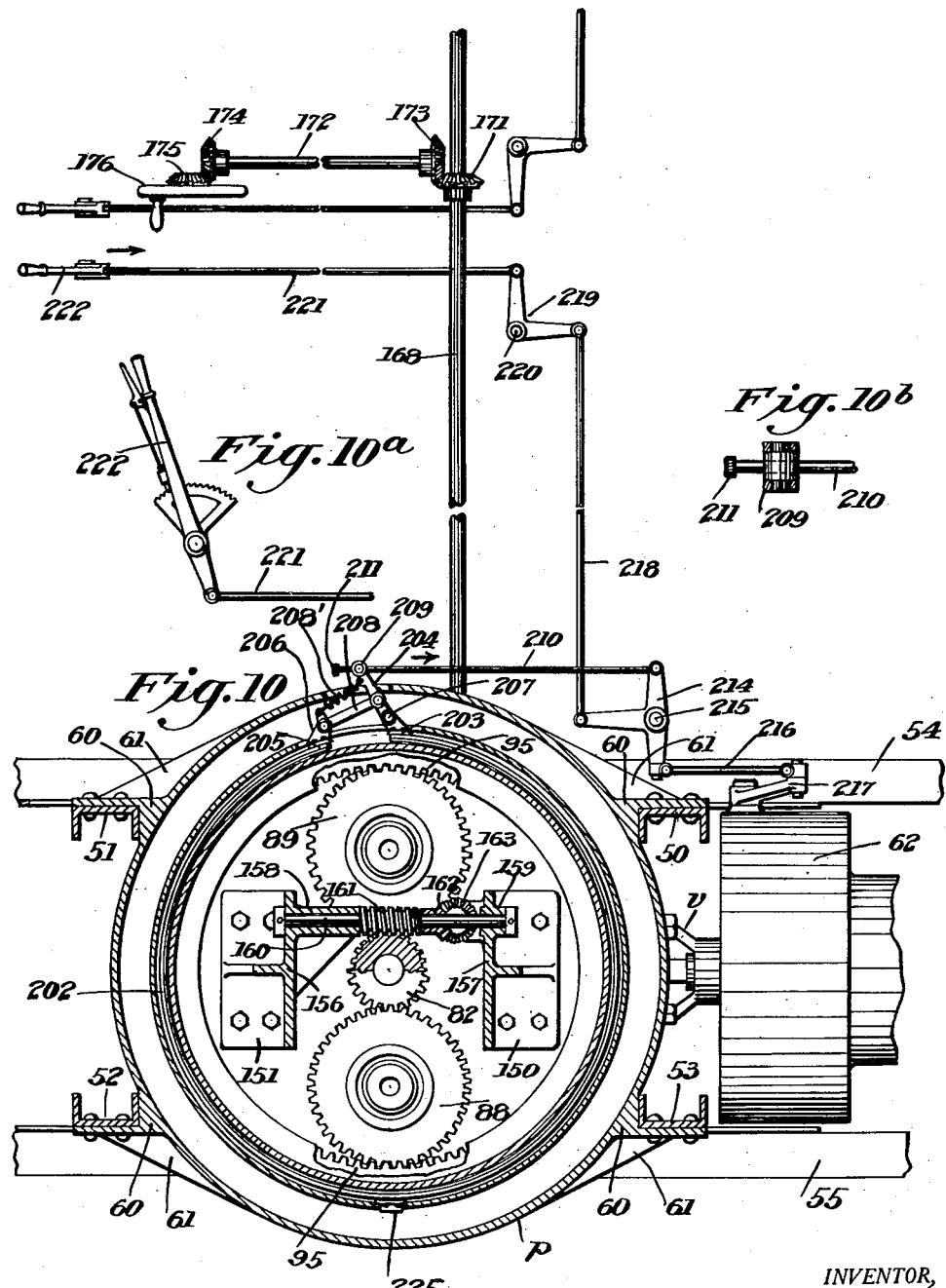

July 16, 1929. H. G. HOOPER 1,721,450
HEAVIER-THAN-AIR FLYING MACHINE
Original Filed Oct. 4, 1926   6 Sheets-Sheet 6
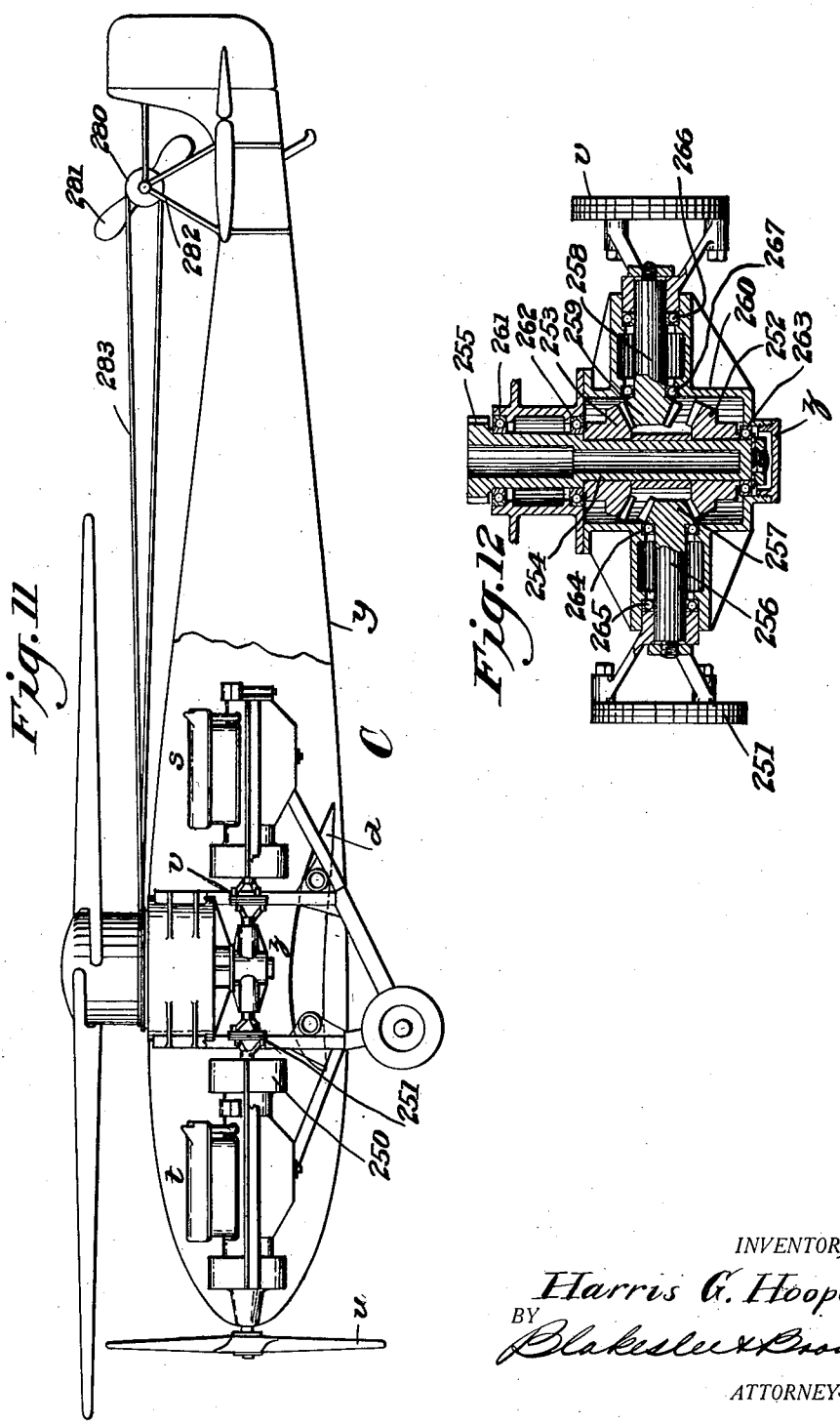
INVENTOR,
Harris G. Hooper;
BY
Blakeslee & Brown
ATTORNEYS.

Patented July 16, 1929.

1,721,450

UNITED STATES PATENT OFFICE.

HARRIS G. HOOPER, OF BROOKLYN, NEW YORK.

HEAVIER-THAN-AIR FLYING MACHINE.

Application filed October 4, 1926, Serial No. 139,507. Renewed December 12, 1928.

This invention relates to heavier-than-air flying machines, and particularly to that type of flying machine known as a helicopter. The well-known conventional aeroplane at the present time is subject to limitations which often result in great hazard to passengers, as well as pedestrians, when in any case there is engine failure. It is a known fact that all modern aeroplanes have what is known as a gliding angle, and in case of engine failure it is necessary that the pilot use the utmost of skill in attempting to land the aeroplane with safety. The hazard is increased where the flying must be done over populated districts and a landing field must be selected at random. The most notable factor entering into this hazard is wind condition, and particularly whether an attempted landing must be made with a tail-wind or a cross wind. The helicopter which forms the subject of this invention is not so liable to be affected by wind conditions, and a flying machine of this type can be stalled and caused to make a substantially vertical descent into a restricted area.

The present invention contemplates a helicopter wherein and whereby there is secured controled vertical ascent and descent.

A further object is the provision of a helicopter wherein wind gusts have little or no destructive effect thereon.

Another object is the provision of a helicopter so constructed as to have great structural strength.

Another object is the provision of a flying machine of the type mentioned which can function as an ordinary aeroplane for forward flight, in addition to direct vertical ascent and descent.

Another object is the provision of a helicopter wherein the lifting wing surfaces thereof may be given any selected angle of incidence while in flight.

A further object comprises a helicopter wherein the driving parts are so arranged that there is no twisting moment therein, all to the end that destructive vibration is reduced to a minimum.

I have by my present invention incorporated many new features, among which is a new type of drive which carries wings to be rotated and which is of great strength; a new type of engine drive for the rotating wings; a balanced torque arrangement between the engine drive and the drive for the wings; variable angle of incidence means for the rotating wings; and a novel clutch arrangement; as well as a novel means for accomplishing transition from vertical to horizontal flight, to the end that no appreciable change in ceiling results.

With the above and other objects in view, the invention consists in the novel and useful provision, formation, construction, association and relative arrangement of parts, members and features, all as shown in certain embodiments in the accompanying drawings, described generally and more particularly pointed out in the claims.

In the drawings:

Figure 1 is a plan view of one form of helicopter embodying my invention;

Figure 2 is a front elevation thereof;

Figure 3 is a cross sectional view, on an enlarged scale, of the lower wing, and showing lateral control means;

Figure 4 is a side elevation of the showing of Figs. 1 and 2;

Figure 5 is a fragmentary and partially sectional view on an enlarged scale, of certain of the operating means for the said rotating wings;

Figure 6 is a longitudinally sectional view of a nacelle showing engines therein and a drive from one of the engines to the rotating wings;

Figure 7 is a fragmentary cross sectional view on the line 7—7 of Figure 6;

Figure 8 is a cross sectional view of a part of the drive mechanism;

Figure 9 is a fragmentary and sectional view of certain of the means used for controlling the angle of incidence of the rotating wings;

Figure 10 is a transverse sectional view on the line 10—10 of Figure 7;

Figure 10$^a$ is an elevation of means for operating certain clutch and brake mechanism associated with the rotating wing structure;

Figure 10$^b$ is an enlargement of certain brake mechanism for the rotating wing structure;

Figure 11 is an enlarged side elevation of a helicopter embodying the invention in combination with means for damping out gyroscopic action; and Figure 12 is a transverse sectional view showing a drive between two engines for driving one of the rotating wing structures.

Corresponding parts in all the figures are designated by the same reference characters.

Referring to the drawings, I have shown two different forms of helicopter, both of which, however, operate upon the same principle. One form is shown in Figs. 1, 2 and 4, and the other form in Fig. 11. The form shown in Figs. 1, 2 and 4 is designated as an entirety by A, and the same includes a fuselage $a$, adapted to have the usual control surfaces such as an elevator $b$, and a rudder $c$. Laterally extending from the fuselage are lifting wing members $d$. In the drawing 1 have shown the wings $d$ as having a slight dihedral and with the landing chassis $e$ associated with the lower wing truss. Thus, I have provided what may be termed a conventional type of aeroplane, and I have provided in addition thereto rotating wing structures $f$ and $g$. These wing structures are adapted to rotate so as to provide for either a direct vertical lift or descent of the helicopter A. It is to be noted that the wing structures $f$ and $g$ are near the wing tips of the wings $d$, and to properly brace these wing structures I have provided a Warren truss $h$ between the wings $d$ and spars $j$, which spars are connected with the fuselage and with the wing structures $f$ and $g$. The spars $j$ are of course properly braced by any of the well known methods, all to the end that rigidity and strength of wing truss is provided. The wings $d$ are provided with the usual ailerons $k$ for lateral control. These ailerons, however, are adapted to be moved so as to be substantially at right angles to the wing spars, as best shown in Fig. 3. The reason for this construction will be described later.

Heretofore inventors have universally contemplated constructing helicopters with propeller-like lifting blades. Experiment has taught that a lifting blade distorts when rotated rapidly and subjected to lifting stresses, and hence the results expected by way of lift of the helicopter are very disappointing. Furthermore, so far as the inventor is aware, none of the prior inventors have made any attempt to directly control the angle of incidence of the rotating wing surfaces of a helicopter when in flight. Further notable features of the present helicopter reside in the turret structure for the rotating wings and a balanced torque drive for said turret structure. The turret structure is so arranged that excessive torsion which is always present when a small shaft is driven under load is reduced by the present device. The helicopter is so constructed that wind gusts, which would be destructive to a small driving shaft for the rotating wings, have no appreciable effect on the present helicopter, as all such stresses are adequately taken care of by the turret arrangement and the wing truss. My helicopter does not depend for its sustentation upon rotating wings alone, but in addition I provide the ordinary wing structure $d$ such as used in aeroplanes whereby the said helicopter may act as an ordinary aeroplane in all of its phases. The helicopter arrangement, however, will permit rapid ascent, and descent within its ceiling limits, as well as rapid forward flight, and the different parts of said helicopter are all designed with the idea of presenting minimum drag to forward and vertical movement thereof. It is intended with the present flying machine to provide a machine wherein vertical ascent or descent may be merged into horizontal flight without loss of sustentation.

The wing structures $f$ and $g$ are identical in construction, and one thereof will now be described. The wing structure $g$ includes two wing members 1 and 2, both said wing members being provided with front and rear spars 3 and 4. The wings are constructed in any approved manner, and are preferably symmetrical, which is to say, a vertical plane cutting the wing along its longitudinal center would have all parts of said wing of symmetrical cross section from such vertical plane to the trailing edge and from such vertical plane to the leading edge. The inner ends of said wings 1 and 2 are cut away at 5 and 6, and the spars 3 and 4 of both said wings extend within said cut-away portions, as illustrated best in Fig. 5, and the front and rear spars for said wings are adapted to be carried by a turret designated generally by B. This turret is formed in two parts $m$ and $n$, and the part $n$ is surrounded by a turret housing $p$. The part $m$ of the turret will be called the turret head.

The turret heat $m$ is substantially circular in form, and provided with enlargements 7 and 8, which enlargements extend outwardly from the periphery of said head, and are substantially parallel. The enlargements are bored so as to receive and likewise confine within the said bores the front and rear spars of the wings 1 and 2, the spars 3 of both of said wings passing entirely through certain of the bores as 9 and 10 of said enlargements and being held by retaining caps 11 and 12. The spars 4 of both said wings are in turn passed through elongated curved slots 13 and 13' in the said enlargements, and ends of said spars carry retaining caps 36 and 40 whereby said spars are held in position within the said elongated slots. It is perhaps unnecessary to state that there are two of said elongated slots 13 directly opposite and in substantial alignment, and that the same is true for the elongated slots 13'.

The said head is likewise provided with two elongated slots 14 and 15 which are substantially parallel and diametrically opposite, and which slots are located midway between the slots 13 and 13'.

Adapted to diametrically span the gap of the turret head is a cross yoke 16, and said cross yoke is enlarged at its ends 17 and 18 and flanged as at 19. The turret head is enlarged adjacent the slots 14 and 15 as shown at 20, and the inner wall surfaces of said enlarged portions are substantially flat as shown at 21. Adapted to be secured to such enlarged portions 20 are guides 22 and 23, and these guides are on opposite sides of the slots 14 and 15 and are so formed as to co-act with the flanged portion 19 of the cross yoke so that the cross yoke may be directed as to its movement. Both enlarged ends 17 and 18 of the cross yoke are likewise chambered or bored, as shown at 24.

Adapted to be received within the openings 24 at each end of the cross yoke are journals 25 and 26, and which journals are suitably secured to said enlarged ends of the cross yoke by pinning, as shown at 27. These journals are both provided with collars 28 which abut against the periphery of the head, and particularly against the flanged area 29 bounding the slots 14 and 15. It will thus be seen that I have provided for each side of the turret head two bearing portions, namely, the flat surface 21 against which an enlarged end of the cross yoke bears and the area 29 against which the collar 28 engages. Adapted to be secured upon the journal 25 is a pair of arms 30 and 31, one of said arms 30 being provided with a bifurcated extremity which is bored to provide a bearing, and an end of said arm 31 is received between the bifurcations of the arm 30 and is likewise bored to provide a bearing. The journal 25 is screw-threaded at 32 to receive a nut 33 whereby the bearing ends of such arms 30 and 31 may be secured upon the said journal 25 between said nut 33 and the collar 28. The opposite ends of said arms are enlarged and bored to provide bearings as indicated at 34 and 35. The rear spar 4 of the wing 2 is passed through such bearing 34 and is secured in position by means of the collar 36 which is pinned to said spar, and the rear spar 4 of the wing 1 is passed through the bearing 35. The spar 4 of the wing 1 is likewise provided with a flange or collar 37 adapted to bear against said arm 31 at its bearing portion and to limit inward movement of said spar. The journal 26 is adapted to carry two arms 38 and 39, the arm 38 being identical in construction with the arm 31, and the arm 39 identical with the arm 30 and for that reason like reference characters will be applied. The arm 39 has its bearing end 34 received on the rear spar 4 of the wing 1 and is held so positioned by an end cap 40 which is pinned to such spar 4. The journal bearing end 35 of the arm 38 is received on the rear spar 4 of the wing 2. This rear spar 4 of the wing 2 is likewise provided with a collar or flange 41 adapted to bear against the surfaces of the arm 38 surrounding the bearing 35. The strength of the structure so far described will be immediately apparent, and the enlargements of the turret head are such as to allow rotative movement of the wing spars and yet prevent side play within the journal portions of such enlargements, and furthermore, this construction aids in the rigidity and the maintenance of the position of the arms 30 and 31 in one instance, and 38 and 39 in the other instance. It is now evident that if some means were used for raising and lowering the cross yoke to cause the same to slide within the guides 22 and 23, that the arms 30 and 31, and 38 and 39, would be moved. Such upward or downward movement of the yoke would move the wings 1 and 2, for the reason that the front spars 3 of each respective wing 1 and 2 are journaled within the enlargements of the turret head. Thus as the rear spars are movable, rotation of the wings is about the front spars as centers. Thus in Figure 6 movement of the rear spar 4 of the wing 1 upwardly would cause the wing to assume the dotted line position of said figure.

Before describing the mechanism for raising and lowering the cross yoke, the turret mounting will be described.

Referring to Fig. 6 I have provided a nacelle $q$, which, in the present instance is suitably stream lined. In particular the nacelle shown in Figure 6 is the one belonging to the wing structure $g$ shown in Figs. 1 and 2. However, the nacelle and members within the same are identical with the nacelle formed for the wing structure $f$. Within the nacelle is frame-work $r$ including upright struts 50, 51, 52 and 53 of channel section, to which upright struts are joined beams 54 and 55 constituting engine bed chambers with suitable diagonal bracing members 56 between the beams and the upright struts. The diagonals 56, as well as the beams 54 and 55 may be of channel section. To properly brace the frame-work as an entirety other bracing members such as 57 and 58 may be provided. Wing fittings 59 are secured to the frame-work $r$ and which fittings are adapted for engagement with the front and rear spars of the wings $d$. Adapted to be received within the nacelle and to be secured to the upright struts is the turret housing $p$. This turret housing is provided on its periphery with outstanding members 60 suitably braced to said turret housing by webs 61, and which outstanding members are adapted to be bolted or otherwise secured to the uprights 51 and 53 inclusive, as shown in Fig. 10. Spaced apart and carried upon the engine bed and at opposite sides of the upright struts are engines $s$ and $t$. The crank shaft of the engine $t$ extends through the nose of the nacelle and has secured thereto a tractor propeller $u$. The engine $s$ has its crank shaft secured to a suitable clutch 62 of any conventional type and the clutch drives through a flexible coupling $v$. The turret housing includes a base member 63 which is formed with a circular flange 64 and the body of said turret housing includes inner and outer substantially circular walls 65 and 66 which are spaced apart and joined by top and bottom members 67 and 68 respectively. The flange 64 of the base is secured to the bottom members 68 in any approved manner such as by bolts 69. The bottom member 68 of the body has a greater width than the width of the flange 64, for a reason that will presently appear. Centrally disposed on said base 63 and extending from both sides thereof is an annular flange 70 which is provided with internal annular flanges 71 and 72 and with an enlarged external annular flange 73. It is evident that this construction would provide a central opening within the base 63. Secured to said flange 73 is a housing or casing 74, this housing or casing being annularly flanged at 75 with bolts 76 or the like passed through said flange 75 and into the flange 73. The said casing is provided with an elongated part 77 which acts as a bearing member for a shaft 78. This shaft is secured at one end to the flexible coupling $v$ and the other end thereof carries a bevel gear 79. Passed through the annular flange 70 is a stub shaft 80, and which stub shaft carries a bevel gear 81, which bevel gear is in mesh with the teeth of the bevel gear 79. This stub shaft has integrally formed thereon or associated therewith in any approved manner a spur gear 82. To properly carry the stub shaft with its gears, I have provided bearing members which include upper and lower inner bearing rings 83 and 84 respectively which are provided with annular ball races. Adapted to cooperate therewith are upper and lower outer concentric bearing rings 85 and 86 likewise formed with annular ball races, and received between the races of the upper and lower bearing rings are bearing members, such as rollers, 87. The bearing ring 85 is carried upon the annular flange 71 and the bearing ring 86 is suitably secured beneath the flange 72. This construction provides what may be termed thrust bearings, as side thrust is adequately handled. The spur gear 82 is adapted to mesh between diametrically disposed idler gears 88 and 89. The journal mounting for both said idler gears is identical and therefore one of said idler gear mountings will be described, like reference characters being applied to the other gear mounting. Gear 89 is mounted upon an axle or shaft 90. The base 73 of the turret housing is formed with a depending part 91 which is bored to receive the axle 90, and the said axle is pinned at 92 to said part 91 to prevent its rotation. Interposed between the axle and the gear are upper and lower bearing members 93 and 94, and the said axle carries a suitable nut 93' for retaining the bearing members and the said gear to the axle. The bearing members will not be detailed because they are similar in all respects to the bearing members for the stub shaft 80. The turret $n$ is annular in form and is fitted within the turret housing and slightly spaced from the wall 66 thereof. The said turret is provided adjacent one end with an internal gear 95, and the teeth of the gears 88 and 89 are adapted to mesh therewith. The opposite end of said turret is provided with an annular flange which extends both inwardly of the turret and outwardly thereof as illustrated at 96 and 97. The turret head is formed with a base flange 98 and said flange is adapted to be secured to the flange 96 by any suitable means 99. The outer flange 97 of the turret is formed with an annular bearing race 100, and the part 67 of the turret housing is formed with a complementary annular bearing race 101, there being bearing members 102 received between the said races. Secured to the opposite end of said turret is an annular nut 103, and this nut may be pinned as at 104 to the turret. This nut is formed with an annular bearing race 105, and the part 69 of the turret housing is formed with a complementary annular bearing race 106, between which races are received bearing members 107. The adjustment of the bearings is readily secured by turning the nut 103 upon the screw threads 108 after which the nut is pinned as before mentioned. This construction provides radial thrust bearings between the turret and its housing.

Secured to the base 63 of the turret housing is a pair of spaced standards 150 and 151 and these standards in the present instance carry there-between a casing or housing 152 which may be integrally formed with said standards and adapted to bridge the gap between said standards. The casing in the present instance is substantially annular in form and provided with an external top flange 153 and with two spaced internal annular flanges 154 and 155. Furthermore, the standards 150 and 151 have their side walls 156 and 157 respectively, provided with bearing members 158 and 159, and which bearing members are in substantial alignment. Received in said bearing members is a shaft 160 carrying a worm gear 161, and likewise a bevel gear 162. The bevel gear 162 has its teeth in mesh with a gear 163. The gear 163 is carried on a shaft 164, which shaft is suitably received within a bearing housing 165 joined with the side wall 157 of the standard 150. This shaft 164 (see Fig. 9) is passed through the base 63 of the turret housing and carries a bevel gear 166. This bevel gear in turn meshes with a second bevel gear 167 carried on a shaft 168, which shaft is in part carried by a journal member 169, the journal member being supported by a member 170 depending from the base 63. This shaft may lie within the wing $d$ and be passed transversely through the fuselage $a$ and out to the other nacelle. As before stated, both nacelles as well as the various members therein are identical with the one just described, and therefore the shaft would co-operate with like mechanism in both nacelles. The shaft where it is within the fuselage carries a bevel gear 171, and a shaft 172 at right angles thereto carries a bevel gear 173 meshing with the gear 171. The opposite end of the shaft likewise carries a bevel gear 174 meshing with a gear 175, the said gear being formed on the hub portion of a hand wheel 176, which hand wheel is within the pilot's cockpit.

Centrally disposed with relation to the cross yoke is a screw-threaded shaft 180. This shaft depends centrally from the cross yoke, being passed through the housing or casing 152 and in part received within the guide bore 181 of the stub shaft 80. Upper and lower bearing members 182 and 183 permit rotation of the yoke and turret head without rotating the shaft. These bearing members are constructed similarly to the bearings described for the stub shaft 80. An internally threaded and elongated nut 184 disposed within the housing 152 is screw-threaded upon the threads of the shaft 180. Furthermore, the said nut is provided with an annular flange 185 and with a pinion gear 186, which gear is adapted to mesh with the teeth of the worm 161. Anti-friction means 187 is interposed between the flange 185 of the nut and the flange 155 of the casing or housing, and anti-friction means 188 is likewise disposed above the flange 154 of the casing or housing and a collar 189 carried by the nut, and which collar is locked in position by a member 190 secured to the nut. It is thus evident from this construction that the nut 184 is prevented from traveling along the screw-threaded shaft 180, but that the said screwthreaded shaft may be raised or lowered when the nut is turned.

It is evident that the turret housing is non-rotatable but that the turret $n$ plus its turret head $m$ are rotatable. Of course during such rotation of the turret the cross yoke would be rotating with the turret head but such rotation would not be communicated to the shaft 180, due to the bearings 182 and 183. As a consequence the cross yoke may be raised and lowered by the shaft 180 and which raising and lowering will actuate the arm members 30, 31 and 38 and 39 to vary the angle of incidence of the rotating wings. Of course this change in incidence is accomplished by the pilot by turning the hand wheel 176, which, through the medium of the aforementioned shafts and gears turns the nut 184.

It becomes necessary at times to stop rotation of the turret and this is accomplished by brake means $x$. In particular the wall 66 is formed with two spaced inwardly projecting annular flanges 200 and 201. This construction of course provides a channel, and received in said channel is a brake band 202. This brake band may be similar to the ordinary brake band as used in automobile practice, and the brake band is split as shown in Fig. 10. One end 203 of the band has secured thereto a lever 204, and the other end or said brake band 205, is secured to a lever 206. The sides 65 and 66 of the turret housing are slotted to permit passage of the levers 204 and 206 therethrough. The lever 204 is suitably pivoted as at 207 to the turret housing, and a link 208 extends between said lever 206 and the arm 204. A coil spring 208' joined to the outer extremities of both the levers tends to urge the inner ends of said levers apart and thus to expand the brake band so that it is normally out of engagement with the turret. The outer end of the lever 204 carries an enlargement 209 which is transversely bored and through which bore is passed a rod 210. This rod carries a head 211, which, in accordance with its movement will contact with the enlargement 209 and urge the lever 204 in the direction of the arrow of Fig. 10, and which movement will cause the lever to pivot about the pivot member 207 and in doing so will contract the brake band about the turret to stop the turret's rotation. In order to strengthen the turret, the turret is provided with inwardly extending spaced annular flanges 212 and 213, and which flanges are adjacent the flanges 200 and 201. The rod 210 is secured to an end of a T crank 214 and said T crank is pivoted at 215 to some one of the bracing members within the nacelle. The T crank lever likewise has secured thereto a link 216 which connects with a lever 217, which lever controls movement of the clutch. Said T crank lever likewise has an arm thereof secured to a link 218, which link connects with an arm of a bell crank lever 219, the bell crank lever being pivoted within the fuselage, at 220, and the opposite arm of said bell crank lever is secured to a link 221, which link in turn is joined to an operating handle 222. Movement of said handle 222 in the direction of the arrow of Fig. 10 will move the bell crank lever 219, as well as the T crank lever 214 through the medium of the link 218 and throw out the clutch by moving the clutch lever 217 prior to the head 211 contacting with the enlargement 209. In other words, the adjustment is such that the clutch connecting the motor with the gearing for turning the turret, is first thrown out prior to braking movement of the turret.

In order that there should not be any unbalanced weights I may provide a counterbalance means such as a weight 225 opposite the control means for the brake band as shown in Fig. 10.

To summarize the invention as so far described, I have provided variable angle of incidence means for the rotating wings which includes: the cross yoke 16; arms 30, 31 and 38 and 39 connected to the spars of said rotating wing structure and the said cross yoke; the shaft 180 secured to the cross yoke and adapted to raise or lower the cross yoke responsive to moving said shaft through means of the nut 184; and the various gears and shafts leading to the pilot's cockpit and which gears and shafts are turned by the wheel 176. I have also provided means for rotating the turret and its head including the motor s driving through the clutch 62 and spur gear 82 to turn idlers 88 and 89 and which idlers mesh with the internal gear 95 of the turret. This arrangement provides for a balanced torque drive as the drive portion of the spur gear is substantially central of the turret and the two idlers are diametrically opposed and in mesh with said spur gear. The clutch arrangement whereby the clutch may be thrown out to disconnect the motor followed by a braking of the turret is also novel. The new vertical axis for driving the rotating wings is novel because it allows large driving members for said wings. When a small shaft is used, the torsion thereon is quite great due to the fact that the wings have considerable leverage, and are at all times subjected to gusts which have a detrimental effect upon a small shaft. The large form of turret is of distinct advantage because it readily permits housing the various operating elements both for driving the rotating wings and for counter-acting destructive stresses. Furthermore, the rotating wings can be more suitably braced by this method of construction. The large drive arrangement for the rotating wings allows for a stored momentum, and which makes the rotation of said wings positive. Quite obviously the arrangement of the bearing surfaces for the turret is likewise a big factor, as the rotating wings, due to their re-active effect upon the air to produce lift of the entire air vehicle, subject to supporting structure to severe stresses. However, the present structure readily permits the weight of the vehicle to be safely carried, whereas a small shaft arrangement in addition to overcoming torsion effect, must carry weight. This naturally places such a type of small shaft in constant tension, with the result that the shaft unless very carefully constructed is liable to be sheared at any moment if a destructive gust upon the rotating wings should be encountered. The present structure lends itself admirably to calculation of stress such as stresses due to wing loading, and drag and bending moments. The advantage of this cannot be over-rated. The inclusion of the spars of the rotating wings within the turret is very important, as it gives a ready support for said wings and acts to minimize destructive bending moments on all parts of the plane connected to the drive arrangement, and further, permits the engine or engines to develop their full power, in that there is less loss by friction. It is, of course, to be realized that I may simplify the power drive arrangement to the rotating wings by a direct couple to the vertical shaft 82 of an efficient prime mover.

In Fig. 11, I have illustrated one form of my invention which differs from that form illustrated in Figs. 1, 2 and 4, in that a single rotating lift wing structure is provided.

I have provided as in the case of said device previously shown the same form of turret, whether it be the wing structure f or g, and the various working and operative parts within the turret is the same as that shown in Fig. 7. In this case, however, the turret structure is located in the fuselage y and the entire device including the fuselage and turret is designated as an entirety by C. The lower wing structure d is provided as before, and I likewise provide the two engines s and t. In the case of the engine t, I add a clutch 250 on one end of the crank shaft, and the opposite end of the said crank shaft projects through the nose of the fuselage and carries a propeller u. A flexible coupling 251 connects with the clutch 250 and a drive unit z acts between the flexible couplings 251 and v. As stated, the mechanical portions of the turret are the same as before, and the said drive unit includes two beveled gears 252 and 253 which are spaced apart and secured to a stub shaft 254. This stub shaft carries at one end a spur gear 255 which corresponds to the spur gear 82, in that it meshes with the idler gears 88 and 89 within the turret. The flexible coupling 251 connects with a shaft 256 which carries a gear 257 in mesh with the teeth of the gear 252, and the flexible coupling v is associated with shaft 258 carrying a gear 259 which meshes with the gear 253. This so-called drive unit is mounted within a housing 260, conveniently carried by the turret housing, and the housing is so formed as to best confine the gears and likewise to confine thrust bearings for the shaft 254, such thrust bearings being shown at 261, 262 and 263. The side extensions of said housing, within which the shafts 256 and 258 are received, likewise are formed to carry thrust bearings 264 and 265 for the shaft 256, and 266 and 267 for the shaft 258. Thus the turning effort of the engine is directly communicated to the shaft 254 to rotate the gear 255. In addition the engine t drives the tractor propeller u. Owing to the large spread of the rotating wing structures there will be a tendency for the entire plane to rotate, and to overcome this I have provided what may be termed anti-gyroscopic means 280. This consists of a small propeller 281 mounted upon suitable framework 282 adjacent the tail unit of the plane, and this propeller may be driven by any suitable means such as 283, to rotate the propeller when the turret head is rotating.

Quite obviously any form of means other than that shown may be used for driving the propeller 281. In the showing of Fig. 11 the rotating wings would revolve to the left, or assuming a plan position, in an anti-clockwise direction, and this rotation would tend to revolve the fuselage in the same direction. However, the propeller 281 would act to counteract this movement.

The operation of the helicopter of the form A is as follows: If we assume that the motors s and t for both wing structures f and g are in operation, the pilot may upon operating the lever 222 throw in the clutch 62 for each of the wing structures, whereupon the wings associated with each turret will commence to revolve. The pilot may adjust the angle of incidence of each of the rotating wings by turning the hand wheel 176 which will raise or lower the shaft 180, which movement will be directly communicated to the rear spars of the rotating wings. In order to assure proper vertical ascent or descent the ailerons k are adapted to take a position as shown by the dotted lines in Figure 3 and thus said ailerons will act in a measure as a rudder for directing vertical movement of the helicopter. If the helicopter were to be flown as an ordinary aeroplane the rotation of the wing structures f and g might be stopped by braking the respective turrets, and at the same time throwing out the clutches 62 which connect with the engine s. The angle of incidence of the wings 1 and 2 associated with each turret might then be adjusted so that the leading and trailing edges of both wings would be in substantial alignment. Thus I would obtain by this method a certain degree of lift from these wings when the machine as an entirety was in horizontal flight. Of course the wings d would support a major portion of the load.

The form C of the helicopter does not differ in operating details from the form just described, save and except that both of the engines are used in the driving of a single turret, and either one or the other of the engines may be disconnected from the drive shaft for said turret by throwing out the clutches.

One of the objects of the invention was to provide a flying machine wherein the change from vertical ascent or descent to horizontal flight might be accomplished without appreciable loss of ceiling, and this object may be carried out in the present flying machine by the following method: The motor t driving tractor propeller u would be started, and motor s would be disconnected through the medium of the clutch 62. When motor t and tractor propeller u were started, forward flight would result and sustentation would be through the medium of the wing structure. Due to the fact that the rotating wing structure has not been stopped abruptly, there would be a certain degree of upward movement of the flying machine with the result that the combined vertical-lift-force along with the forces tending to draw the machine forwardly known as the horizontal component, would give a resultant diagonal flight to the flying machine. Of course, this resultant movement would rapidly be changed to a true horizontal movement depending upon operation of the elevators. It is evident upon descending that the same operation as indicated above might be relied upon.

It is obvious that various changes and modifications may be made in practicing the invention, in departure from the particular showing of the drawings, without departing from the true spirit of the invention.

Having thus disclosed my invention, I claim and desire to secure by Letters Patent:

1. In a flying machine having a fuselage and monoplane wing structure attached thereto, a nacelle adjacent each extremity of the monoplane structure, a revoluble turret for both nacelles, and wing structures attached to said turrets; there being propulsion means in both turrets for driving said turrents, and means for disconnecting said propulsion means from said turrets.

2. In a flying machine having a fuselage and monoplane wing structure attached thereto, a nacelle adjacent each extremity of the monoplane wing structure, a revoluble turret for both nacelles, and wing structures attached to said turrets; there being propulsion means in both turrets for driving said turrets, and means for disconnecting said propulsion means from said turrets; in combination with means for braking motion of said turrets when said propulsion means is so disconnected.

3. In a flying machine, a turret, including a turret head, said turret head being formed with journal portions, a pair of wings provided with front and rear spars, said front spars of said wings being received in said journal portions, and means within said turret head and cooperating with said rear spars of the wings for revolving said wings about the front spars as centers.

4. In a flying machine, a pair of lifting wings provided with front and rear spars, a supporting member between said wings, means for journaling the front spars of both said wings to said supporting member, a member to be moved, and a pair of levers carried by said member and associated with the rear spars of said wings and whereby when the member to be moved is given movement said wings will vary their angle of incidence relative to said supporting member.

5. In a flying machine, an annular turret, a turret housing surrounding said turret, end thrust bearings between said housing and said turret, and means for taking up said bearings.

6. In a flying machine, an annular turret, a cross yoke diametrically spanning the gap of said annular turret, means for guiding movement of said cross yoke, a pair of wings carried by said turret, and means associated with the cross yoke and said wings whereby when the cross yoke is moved the angle of incidence of the wings is varied.

7. In a flying machine, an annular turret, a cross yoke diametrically spanning the gap of said turret, a pair of wings having front and rear spars, said front spars being journaled in said turret, and means between the cross yoke and the rear spars of said wings whereby when said cross yoke is moved the wings will be moved relative to the front spars as centers to vary the angle of incidence of said wings.

8. In a flying machine, an annular turret, a cross yoke diametrically spanning the gap of said turret, a pair of wings having front and rear spars, said front spars being journaled in said turret, and means between the cross yoke and the rear spars of said wings whereby when said cross yoke is moved the wings will be moved relative to the front spars as centers to vary the angle of incidence of said wings; in combination with a fuselage for said flying machine and control means within said fuselage for moving said cross yoke.

9. In a flying machine, a rotating wing structure, drive means for said rotating wing structure, and brake means for said rotating wing structure, and means which when moved will first disconnect said drive means from the rotating wing structure, then apply the brake means thereto.

10. In a flying machine having the usual wing structure, a nacelle adjacent both extremities of said wing structure, revoluble turrets for the nacelles, wing structures joined to said turrets, propulsion means for driving the turrets, and clutch means between the propulsion means and the turrets, in combination with means for braking motion of said turrets when the clutch means disconnects the propulsion means from said turrets.

In testimony whereof, I have signed my name to this specification.

HARRIS G. HOOPER.